Patented July 15, 1930

1,770,687

UNITED STATES PATENT OFFICE

CLYDE C. DE WITT, OF HOUGHTON, MICHIGAN

SYNTHETIC MOLDING MATERIAL AND METHOD OF FORMING SAME

No Drawing.　　　Application filed April 8, 1929.　Serial No. 353,695.

This invention relates to molding materials such as are employed in the casting of molten metals and relates particularly to a material of this type which is synthetically produced.

The material universally used in the casting of molten metals is what is known as molding sand. This sand, which is found in the natural state, has the characteristic that when moistened and formed to shape it will retain such shape while molten metal is poured therein, whereby after the metal has cooled the metal may be shaken out of the sand in its formed state. Natural molding sands are found in a relatively small number of localities throughout the country and generally occur in beds from three to fifteen feet deep. Invariably in such beds the sand near the top is too rich in binding qualities to be suitable for use, and that portion of the sand at the bottom of the bed is excessively lean in binder, while the central portion is usually of the desired quality. For this and other reasons, the uniformity of natural molding sands varies through a considerable range, which is oftentimes of great disadvantage in molding operations. Furthermore these sands, because of their relative scarcity, and because of the cost of transporting them to the point of use, are relatively expensive.

Accordingly, it is the principal object of the present invention to provide a synthetic molding material which may be formed in any desired quantities and of uniform properties throughout, and which will be equal to the highest grade natural molding sands now on the market in both quality and performance.

It is another object to provide such material that may be made at any point that a relatively clean sand of any type is available.

I have found that if substantially naked sand, such as shore sand, (which may be obtained in any desired quantities at a very small cost and in almost any locality) is so treated as to be artificially coated with a film of iron hydrogel, such sand upon being moistened, may be employed as a molding material either by itself or in combination with other materials. This coating of iron hydrogel is substantially insoluble in water and consequently cannot be washed off with water. When this coated sand is moistened and is allowed to remain in a moistened condition for a short time, the iron hydrogel coating adsorbs a certain amount of the water and swells, and when formed into a mold the gelatinous coats of the adjacent particles coalesce with each other and bind the various grains together in a homogeneous mass able to hold its shape and withstand the pouring action of molten metals.

It has been suggested in connection with molding sands which either are lean in binders as found in the natural state, or have lost part of their binding qualities through continued or repeated use, that the addition of finely divided clay to the sands will aid in restoring the binding characteristics necessary for molding purposes. The addition of such clay does, in fact, increase the binding characteristics of the sand to a certain extent, but I have found that it is impossible by simply the addition of clay to make a naturally lean molding sand equal to a molding sand having the desired binding characteristics of the best natural sands, or to rejuvenate a spent or partially spent molding sand to its original natural conditions by such addition. I have discovered, however, that if the particles of such clay, either before or after they are mixed with the sand, are individually covered with a coating of iron hydrogel in the same manner as the sand grains above described, the resulting mixture will be, in every respect, equal to the best natural molding sands that are obtainable.

In thus employing a naturally naked sand in forming this synthetic molding material, and considering the sand to be substantially free of foreign material, I have found that the addition of from 8% to 18% of finely divided clay added to the same gives the best result. The sand and clay particles may be treated to produce the coating of iron hydrogel either before or after mixture with each other. The particular amount of clay to be added for this purpose will, of course, depend to a great extent upon the permeability desired in the final product, and this fact will be further determined to a greater or less extent by the size of the sand grains employed. With sand grains corresponding to those found in the best natural molding sands I have found that the addition of approximately 13% by weight of clay gives the best result for usual uses. It is to be understood, however, that the present invention is not limited to the above percentages, as in some cases the percentage of clay-like substance may vary considerably therefrom.

In reviving spent or partially spent natural molding sands, the amount of clay which is to be added will depend to a great extent upon the percentage of inerts present in such sand. Such inerts will usually consist of those clay particles which have been irreversibly peptized by the high temperature of the molten metal with which they have come in contact. Such inerts may be removed by an air-blowing or other suitable process, and preferably before the addition of the new clay. As in the case of the wholly synthetic molding sand, the spent or partially spent molding sand may be treated to provide it with a coating of iron hydrogel either before or after the admixture of clay with it, the clay, of course, being treated to provide each particle with a like coating if it is added after the sand has been already provided with such coating.

It has been above pointed out that the iron hydrogel coating on the sand grains is virtually insoluble in water and when moistened the coating swells and the coatings on adjacent grains coalesce with each other, so that when allowed to dry a formed mass will remain in the molded form. Not only will this occur, but the particles of coated clay are also held to the sand grains by mechanical coalescence. Further, the surfaces of the original sand grains are increased many fold by the addition of the clay and this provides many additional points of contact between adjacent grains.

When a group of these particles is so treated and intimately associated with one another in a moistened condition, the particles are held together by another force—the tensile strength of the water at the points of contact. In the dry condition the strength of the molded material so associated is due to the fact that the films of material having coalesced in the wet condition are interlocked when dry, thus providing many points of contact and, hence, of strength. If the particles are separated in the dry state, they must of course be moistened and time must be allowed for the gelatinous coatings to swell, in order to develop the peculiar characteristic of strength known as "green bond", which is caused by nothing more or less than the coalescence of the films of the individual particles in a moist condition.

In preparing a synthetic molding sand in accordance with the present invention, the method which I prefer to follow is to treat relatively infusible grains of bare sand and clay individually with an iron hydrosol having a pH range of from 4.5 pH to 6.2 pH. Afterward I mix, or mull, in a moist condition the sand and clay grains which have been thus treated in order that the individual films of sand and clay grains may have an opportunity to contact and coalesce with one another.

The sand and clay grains may be treated with the iron hydrosol in the dry state or in a moist state and after one treatment the sand and clay grains may be partially dried and re-treated with iron hydrosol until the sand or clay or the mixture of sand and clay contains the desired amount of iron hydrogel. No more than an active surface film of iron hydrogel is usually necessary. Iron hydrogel present in too great amount results in the formation of relatively low fusing point iron silicates when the molding material is heated.

Burned-out molding sands are also susceptible to renovation by this process if their fusing point has not been seriously affected by repeated use. If this material in the dry state is air-cleaned to remove excessively fine material, it can be treated with an iron hydrosol in the manner and under the conditions previously described, then the treated "burned molding sand" may be mixed or mulled with the treated clay. This process may be continued until the low fusibility of the product renders it unfit for use as a molding sand.

The coating of the grains of silica and kaolin (or clay) with iron hydrogel may be accomplished equally well by subjecting such grains to the action of an iron hydrosol prepared in a number of ways. The method recommended for preparing the iron hydrosol is:—(1) Allow a dilute solution of ferric chloride to dissolve all the hydrated iron oxide or ferric hydroxide that it can when the temperature of the solution is approximately 90°–100° C. When properly prepared, such a solution will contain approximately one part of ferric chloride to fifteen parts iron oxide. The resultant colloidal solution will be a clear, amber-colored liquid. The pH value of the iron hydrosol may be adjusted by means of suitable neutralizing agents or buffers, the function of which can be obtained from any textbook on physical or electro-chemistry.

Other methods of preparing iron hydrosol may be used equally well, but inasmuch as the present invention does not relate to the preparation of the same, it is not thought necessary to describe the same here.

While I have described the present invention as employing sand as one of the elements, it is of course apparent that it is quite possible that other refractory material having a grain size similar to that of sand may be coated with iron hydrogel as above described and thus be employed for substantially the same purpose, and it is to be understood that in the following claims where the word "sand" is employed, it is to be interpreted not as limited solely to sand itself, but to any other refractory material of like grain size which may be employed in its stead in molding operations.

The same thought is true in connection with the word "clay," which I have used in the specification and which is used in the claims. There is of course a relatively large number of finely divided colloidal materials of a composition and nature similar to what is commonly known as clay, which are known by other names and which may be employed in the same manner and for the same purpose as the clay above described. The word "clay" as used herein is to be interpreted accordingly.

Formal changes may be made in the specific embodiment of the invention described without departing from the spirit and substance of the broad invention, the scope of which is commensurate with the appended claims.

What I claim is:

1. A molding material comprising a mixture of sand and clay the particles of which are provided with an artificial inorganic gel coating.

2. A molding material the bulk of which comprises a mixture of sand and clay each individual particle of which is provided with an artificial inorganic metallic gel coating.

3. A molding material the bulk of which comprises a mixture of sand and clay each individual particle of which is provided with an artificial inorganic metallic gel coating substantially insoluble in water after drying at normal temperatures.

4. A molding material comprising a mixture of sand and clay the particles of which are provided with an artificial coating of iron hydrogel.

5. An article of manufacture comprising a synthetic molding material composed of a mixture of sand and colloidal clay both of which have been artificially coated with an inorganic metallic gel insoluble in water.

6. A molding material comprising a mixture of sand and clay artificially treated with an iron hydrosol solution.

7. The method of treating a sand-clay mixture to render it suitable for molding purposes, comprising in subjecting said mixture to the action of an iron hydrosol solution having a pH value between 4.5 and 6.2.

8. The method of making a synthetic molding material comprising in subjecting grains of sand naturally unsuitable for molding purposes to the action of an iron hydrosol solution whereby to coat said grains with iron hydrogel, subjecting clay to the action of an iron hydrosol solution whereby to coat the particles thereof with iron hydrogel, and thereafter mixing said coated sand grains and said coated clay particles.

9. The method of making a synthetic molding material comprising in subjecting a mass of sand, naturally unsuitable for molding purposes, to the action of an iron hydrosol solution whereby to provide the grains thereof with an artificial coating of iron hydrogel, subjecting a mass of finely divided clay to the action of an iron hydrosol solution whereby to provide the particles thereof with an artificial coating of iron hydrogel, and mixing said sand and clay in the proportion, by weight, of 100 parts of sand to from 8 to 18 parts of clay.

CLYDE C. DE WITT.

CERTIFICATE OF CORRECTION.

Patent No. 1,770,687. Granted July 15, 1930, to

CLYDE C. DE WITT.

It is hereby certified that error appears in the printed specification of the above numbered patent requiring correction as follows: Page 2, lines 18 and 19, for the misspelled word "peptized" read pektized; and that the said Letters Patent should be read with this correction therein that the same may conform to the record of the case in the Patent Office.

Signed and sealed this 24th day of February, A. D. 1931.

(Seal)

M. J. Moore,
Acting Commissioner of Patents.